(12) United States Patent
Azdasht (10) Patent No.: US 10,286,470 B2
(45) Date of Patent: May 14, 2019

(54) DEVICE FOR THE SEPARATE APPLICATION OF CONNECTING MATERIAL DEPOSITS

(71) Applicant: Pac Tech—Packaging Technologies GmbH, Nauen (DE)

(72) Inventor: Ghassem Azdasht, Berlin (DE)

(73) Assignee: PAC TECH—PACKAGING TECHNOLOGIES GMBH, Nauen (DE)

(*) Notice: Subject to any disclaimer, the term of this patent is extended or adjusted under 35 U.S.C. 154(b) by 347 days.

(21) Appl. No.: 15/027,611

(22) PCT Filed: Jul. 3, 2014

(86) PCT No.: PCT/EP2014/064164
§ 371 (c)(1),
(2) Date: Apr. 6, 2016

(87) PCT Pub. No.: WO2015/055328
PCT Pub. Date: Apr. 23, 2015

(65) Prior Publication Data
US 2016/0250704 A1    Sep. 1, 2016

(30) Foreign Application Priority Data

Oct. 16, 2013 (DE) .................. 10 2013 017 159

(51) Int. Cl.
*B23K 3/04* (2006.01)
*B23K 3/06* (2006.01)
(Continued)

(52) U.S. Cl.
CPC ............ *B23K 1/0056* (2013.01); *B23K 1/018* (2013.01); *B23K 3/04* (2013.01); *B23K 3/0623* (2013.01)

(58) Field of Classification Search
CPC .... B23K 1/0056; B23K 1/018; B23K 3/0623; B23K 3/04
(Continued)

(56) References Cited

U.S. PATENT DOCUMENTS 5,615,823 A    4/1997 Noda et al.
5,867,260 A    2/1999 Sakai
(Continued)

FOREIGN PATENT DOCUMENTS

CN    202114398 U  *  1/2012
CN    102528283 A     7/2012
(Continued)

OTHER PUBLICATIONS

Korean Intellectual Property Office, Notice of Rejection, Application No. 10-2016-7008501, dated May 2, 2017.
(Continued)

*Primary Examiner* — Thien S Tran
(74) *Attorney, Agent, or Firm* — Quarles & Brady LLP (57) ABSTRACT

The invention relates to a device (10) for the separate application of solder material deposits, in particular solder balls, comprising a conveying device for separately conveying the solder material deposits from a solder material reservoir toward an application device (33), the conveying device having transport holders that are formed as passage holes and that can each be moved from a receiving position P1, in which a solder material deposit is received from the solder material reservoir, into a transfer position P2, in which the solder material deposit is exposed to a pressure gas and from which the solder material deposit is transferred to the application device into an application position P3, wherein a removal device (46) for removing a solder material deposit from a transport holder arranged in a removal position P4 is arranged downstream of the transfer position
(Continued)

in the conveying direction, the removal device being connected to a detector device for triggering the removal function, said detector device checking the condition of the transport holder in the transfer position.

7 Claims, 5 Drawing Sheets

(51) Int. Cl.
*B23K 1/005* (2006.01)
*B23K 1/018* (2006.01)

(58) Field of Classification Search
USPC .......... 219/121.6, 229, 231; 228/4.5, 41, 53, 228/119, 121.6
See application file for complete search history.

(56) References Cited

U.S. PATENT DOCUMENTS

| | | | |
|---|---|---|---|
| 6,119,919 A | | 9/2000 | Kasulke |
| 6,152,348 A | * | 11/2000 | Finn ..................... B23K 3/0607 228/1.1 |
| 2005/0031776 A1 | | 2/2005 | Zakel et al. |
| 2011/0107580 A1 | | 5/2011 | Ishikawa et al. |

FOREIGN PATENT DOCUMENTS

| | | |
|---|---|---|
| CN | 203091911 U | 7/2013 |
| DE | 195 41 996 | 5/1997 |
| JP | H11514933 A | 12/1999 |
| JP | 2002-170351 | 6/2002 |
| JP | 2005079492 A | 3/2005 |
| JP | 2008207244 A | 9/2008 |
| TW | 201009968 A | 3/2010 |

OTHER PUBLICATIONS

PCT English Language Translation of the International Preliminary Report on Patentability, PCT/EP2014/064164, dated Apr. 28, 2016.
The International Search Report as dated Dec. 16, 2014 for International Application No. PCT/EP2014/064164.
Japan Patent Office, Notice of Grounds of Rejection, Application No. 2016-517394, dated Feb. 20, 2018, 8 pages.
Taiwan Intellectual Property Office, First Office Action and Search Report, Application No. 103128007, dated Jul. 26, 2016.

* cited by examiner

DEVICE FOR THE SEPARATE APPLICATION OF CONNECTING MATERIAL DEPOSITS

CROSS-REFERENCE TO RELATED APPLICATIONS

This application represents the national stage entry of PCT International Application No. PCT/EP2014/064164 filed Jul. 3, 2014 and claims priority to German Patent Application No. 10 2013 017 159.8 filed Oct. 16, 2013 . The contents of this application are hereby incorporated by reference as if set forth in their entirety herein.

The present invention relates to a device for the separate application of solder material deposits, in particular solder balls, comprising a conveying device for separately conveying the solder material deposits from a solder material reservoir toward an application device, the conveying device having transport holders that are formed as passage holes and that can each be moved from a receiving position, in which a solder material deposit is received from the solder material reservoir, into a transfer position, in which the solder material deposit is exposed to a pressure gas and from which the solder material deposit is transferred to the application device into an application position.

A device of the kind mentioned in the introduction is known from DE 195 41 996 A1. Said device has proved itself in practice over many years and usually allows error-free operation. Because of the relative motion taking place in the device between the transport holders and the solder material deposits transferred from the solder material reservoir to the conveying device, solder material may be deposited on the conveying device and material may in particular accumulate at the edge of the passage holes. Said material accumulations may have the result, in particular in case of insufficient maintenance of the device, that solder material deposits that are arranged in the transport holders of the conveying device are occasionally not transferred from the transfer position into the application position but stay stuck in the transport holder. In principle, it is also possible that individual solder material deposits are sheared off when solder material deposits are being received in the transport holders of the conveying device because of improper assembly of the device after a maintenance process owing to inaccurately adjusted tolerances between the conveying device and the device housing so that the solder material deposits or parts of the solder material deposits are received in the transport holders in a wedged manner and consequently cannot by completely removed from the transport holder in the transfer position for transfer to the application device by the application of pressure gas.

It is possible to drive the device and in particular the conveying device of the device in a clocked manner in such a way that when a solder material is detected that cannot be completely removed from the transport holder by the application of pressure gas, the conveying device moves by one graduation, i.e. to the subsequent transport holder, so as to transfer a subsequent solder material deposit into the application device instead of the inapplicable connecting material deposit. However, this is disadvantageous because, on the one hand, the capacity of the conveying device cannot be fully used and, on the other hand, time losses occur based on the cycle time required by the conveying device for moving away the faulty solder material deposit.

Faulty solder material deposits of this kind, which cannot be removed from the transport holders by applying pressure gas, of course have a particularly negative effect if during the operation of the device their number reaches a scale that makes it impossible to effectively operate the device. Then, at the latest, the device must be disassembled and inspected in addition to the maintenance necessary anyway for the general operability of the device, which is accompanied by corresponding production downtime.

Hence, it is the object of the present invention to enhance the known device so that the maintenance effort can be reduced overall.

This object is attained by a device exhibiting the features of claim 1.

In the device according to the invention, a removal device for removing a solder material deposit from a transport holder arranged in a removal position is provided in a removal position downstream of the transfer position in the conveying direction, the removal device being connected to a detector device for triggering the removal function, said detector device checking the condition of the transport holder in the transfer position.

After detection of a faulty condition of a transport holder, i.e. after detection of a solder material deposit or of parts of a solder material deposit in the transport holder after the transport holder arranged in the transfer position has been exposed to pressure, the device according to the invention allows the solder material deposit to be removed from the transport holder by means of the removal device realized on the device without having to disassemble the device as a prerequisite for cleaning or inspecting the conveying device. Instead, the condition of the transport holder can be checked in the transfer position during operation, i.e. in situ, and the solder material deposit can be removed from the transport holder also in situ in the removal position after detection of a blockage of the transport holder.

It is particularly advantageous if the detector device has a pressure sensor that measures the gas pressure in the application device between the transport holder and an application opening in an application nozzle of the application device. This makes it possible to use the same pressure sensor both for a laser treatment of the solder material deposit in the application position, in which the solder material deposit is located at the application opening, and for checking the condition of the transport holder so that no separate sensor is necessary for the operation of the removal device.

It is particularly advantageous if the removal device has a removal duct for coaxial arrangement of a duct end of the removal duct with a transport holder arranged in the removal position, and a negative pressure connection for applying negative pressure to the removal duct, and a coupling device for connection to an energy source that is used for the treatment of a connecting material deposit arranged in the transport holder. In this way, treatment of a solder material deposit arranged in the transport holder with energy so as to melt the solder material deposit and with negative pressure so as to remove the molten solder material deposit from the transport holder can be effected through the same removal duct.

Preferably, the removal duct is realized in a connecting piece of the removal device, said connecting piece allowing a removable mechanical connection of the removal device to a device housing in such a manner that the removal duct is arranged coaxially to a transport holder arranged in the removal position. In this way, a modular design of the removal device is possible, which can be added to the device as a module and which is not necessarily realized integrally in the device. Thus, the operator of the device for the separate application of solder material deposits can retrofit a standard or ready-made device as required with a removal device.

It is particularly advantageous if the coupling device is realized in such a way that it is not only used for the connection to an energy source, but at the same time it also forms the negative pressure connection for applying negative pressure to the removal duct.

The energy treatment of the solder material deposit for removal from the transport holder can be implemented in a particularly effective fashion if the coupling device allows the removal device to be coupled to a laser source that emits laser radiation and allows quick heating and liquefying of the solder material deposit in the transport holder, which can subsequently be removed from the transport holder by applying negative pressure.

Moreover, the coupling device generally allows the connection of an energy source or in particular of a laser source emitting laser radiation to the removal device independently of another laser source emitting laser radiation that serves to treat the solder material deposits in the application device. Thus, it is possible to operate the removal device in parallel to the application device.

Preferably, the coupling device is realized in such a manner that a contact-free coupling to the laser source becomes possible so that it will not be necessary to manually decouple the laser source from the device, i.e. to remove a connecting device, for example, in case of disassembly or maintenance of the device for the separate application of solder material deposits.

Alternatively, however, it is also possible that the coupling device is realized as a connecting device for an optical fiber transmitting the laser radiation of the laser source.

In the following description, a preferred embodiment of the device will be explained in more detail with reference to the drawings.

Figure 1:
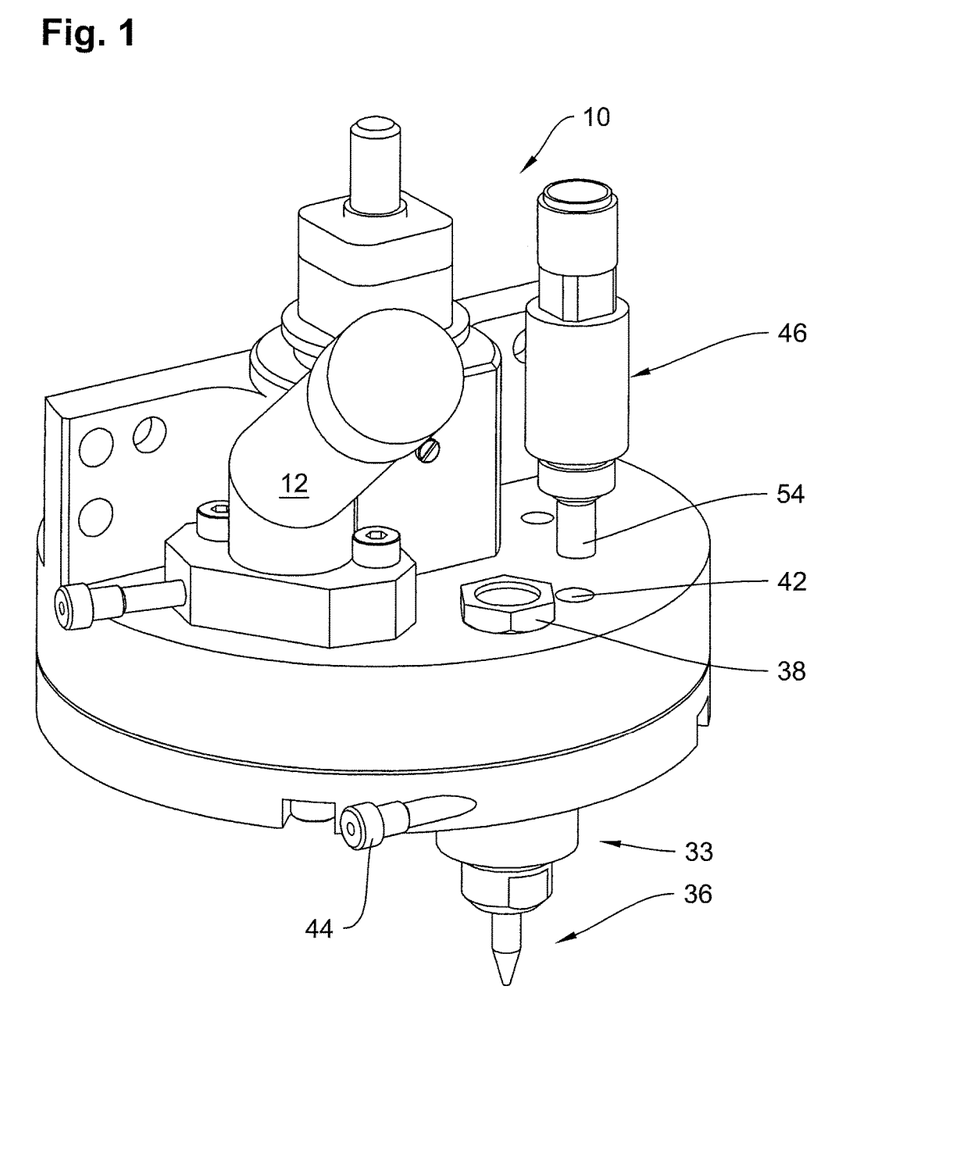
FIG. 1 shows a device for the separate application of solder material deposits in an isometric illustration.
Figure 2:
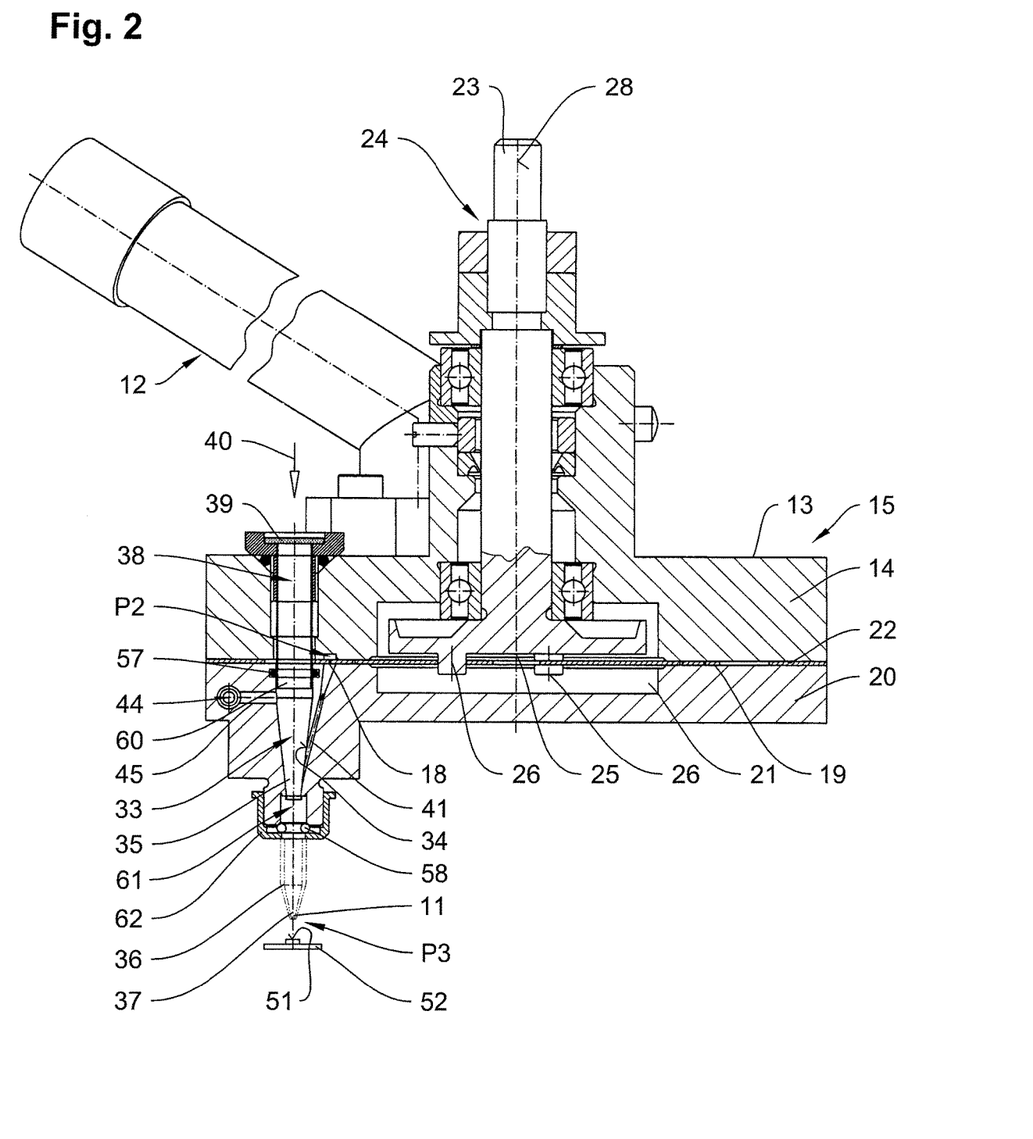
FIG. 2 shows the device illustrated in FIG. 1 in a sectional illustration.

In FIGS. 1 and 2, a device 10 for the separate application of solder material deposits 11 is illustrated, the solder material deposits 11 in the present case being realized as solder material balls that are held for provisioning in a solder material reservoir 12 that is arranged on a top side 13 of an upper housing part 14 of a device housing 15. In the upper housing part 14, a solder material duct 17 is formed below a connection opening 16 (FIG. 4), said solder material duct 17 allowing solder material deposits 11 to travel, as illustrated in FIG. 1, from the solder material reservoir 12 into transport holders 18 (FIG. 3) formed as passage holes of a conveying device 19 that is formed as a circular conveying disk and that is received between the upper housing part 14 and a lower housing part 20 in a circular conveying space 21. To form the circular conveying space 21, a housing ring 22 is arranged concentrically with respect to the conveying device 19 between the upper housing part 14 and the lower housing part 20.

Figure 3:
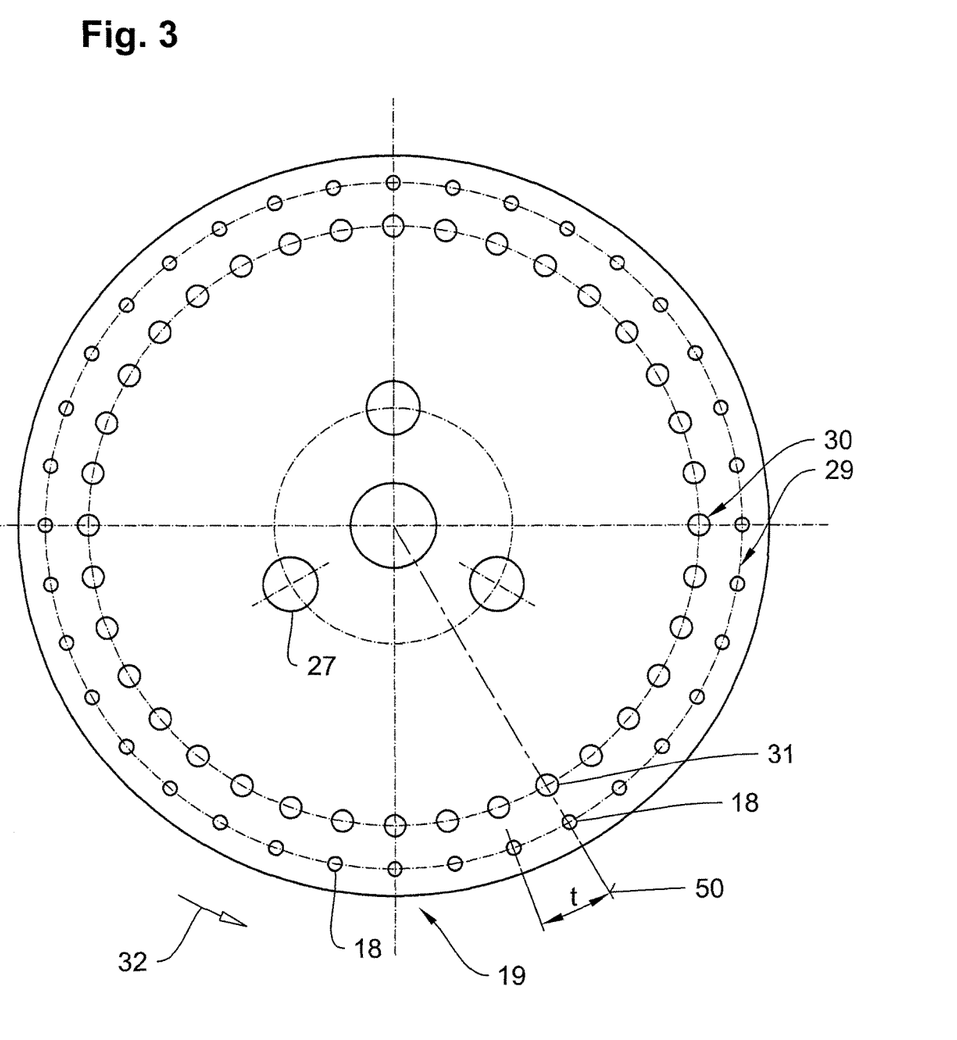
FIG. 3 shows a conveying device of the device illustrated in FIG. 2 in a top view.

In the upper housing part 14, a conveying shaft 24 is located that can be coupled with a motor drive (not illustrated) at its input end 23 and that allows a rotary drive of the conveying device 19 about a rotation axis 28 via drive pins 26 that are arranged at its output end 25 and engage into engagement openings 27 of the conveying device 19 illustrated in FIG. 3.

As FIG. 3 shows, in addition to the transport holders 18, which are arranged equidistantly on a conveying circle 29 of the conveying device 19, the conveying device 19 has a control circle 30 that is arranged concentrically and within the conveying circle 29 in the present case and that has control bores 31 on a common radial axis 50 with the transport holders 18 in each case. Said control bores 31 interact with a light barrier device (not illustrated) arranged in the device housing 15 and permit control of a clocked circular conveying motion of the conveying device 19 about the rotation axis 28 in such a manner that, in the conveying direction 32 of the conveying device 19, the transport holders 18 are moved forward out of a receiving position P1 below the solder material duct 17 connected to the solder material reservoir 12 each time by a graduation t of the conveying circle 29 in the conveying direction 32 and arrive in a transfer position P2 in which the transport holders 18 are located in a coaxial or flush arrangement with respect to a supply duct 41 that is formed in the lower housing part 20, extends from the transfer position P2 to the application device 33 and ends with a discharge end 34 in an application duct 35 of the application device 33.

On its lower end, the application device 33 has an application nozzle 36 that is arranged in an exchangeable manner on the lower housing part 20 and comprises an application opening 37, which, in the present case, has a diameter that is smaller than the diameter of the solder material deposits 11 so that a solder material deposit 11 transferred from the transfer position P2 to the application nozzle 36 comes to bear against an opening edge of the application opening 37 in an application position P3. In the present case, the application nozzle 36 is screwed to the lower housing part 20 by means of a cap nut 62, the connection of the application nozzle 36 to the lower housing part 20 comprising a seal 58 so as to be sealed against the lower housing part 20.

A coupling device 38 arranged within the upper housing part 14 of the device 10 is located at the upper end of the application duct 35, said coupling device 38 being provided with a transparent coupling surface 39 at the top side 13 of the upper housing part 14 in the present case. Via the coupling surface 39, the solder material deposit 11 arranged in the application position P3 can be treated with laser radiation 40, which is emitted by a laser source (not illustrated).

The coupling device 38 is formed in the shape of a sleeve and is sealed against the lower housing part 20 by a seal 57 that is formed at its lower end, which protrudes into the lower housing part 20, said seal here being realized as an O-ring. Moreover, the lower end of the coupling device 38 is provided with a transparent gas-tight cover 60 that limits a pressure chamber 61 at the top, said pressure chamber 61 being realized in the application duct 35 above the application opening 37.

As a result of the laser treatment of the solder material deposit 11, the solder material deposit 11 melts at least partially so that the solder material deposit 11 can be thrown out through the application opening 37 of the application nozzle 36 by means of an application of pressure gas to the solder material deposit 11 via the supply duct 41 ending in the application duct 35 and can be applied against a contact surface 51 of a substrate 52.

Figure 4:
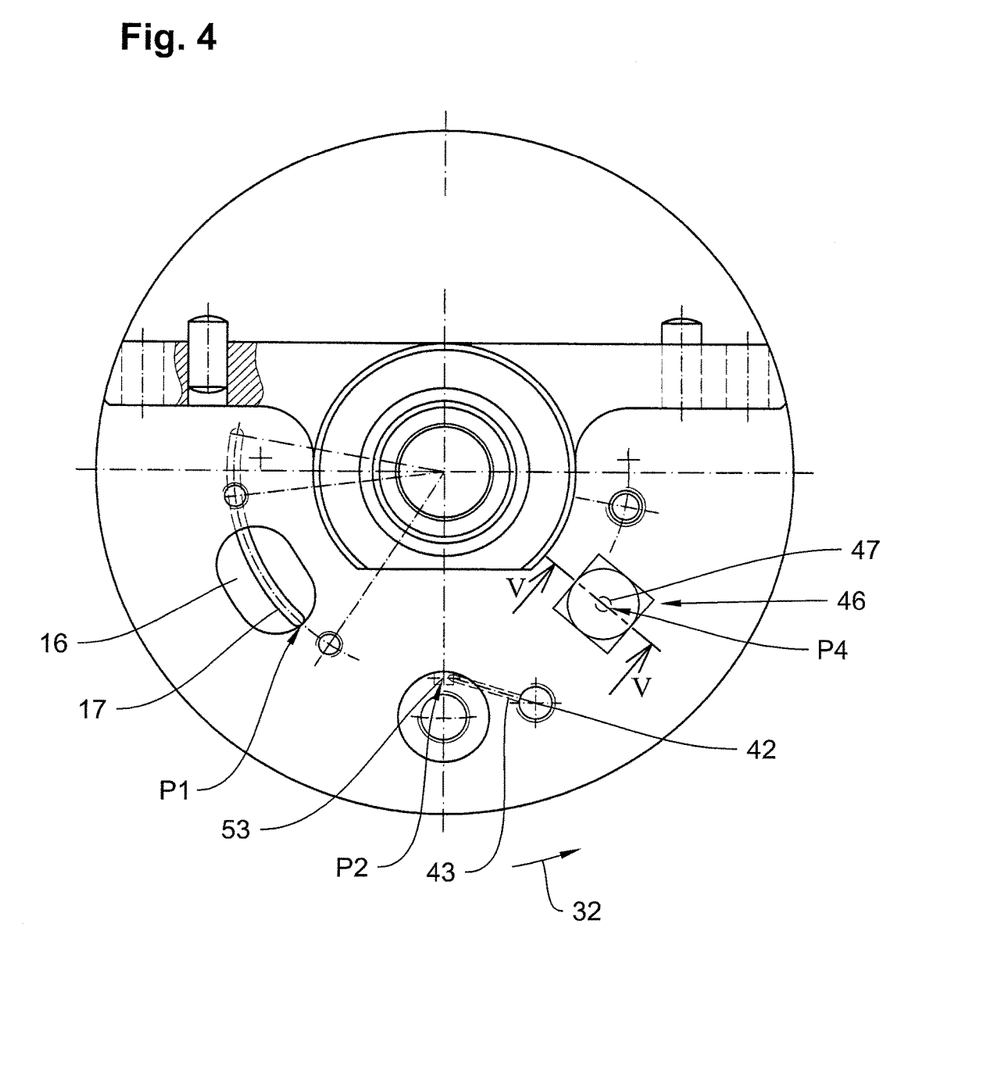
FIG. 4 shows a top view of a device housing of the device illustrated in FIGS. 1 and 2.
Figure 5:
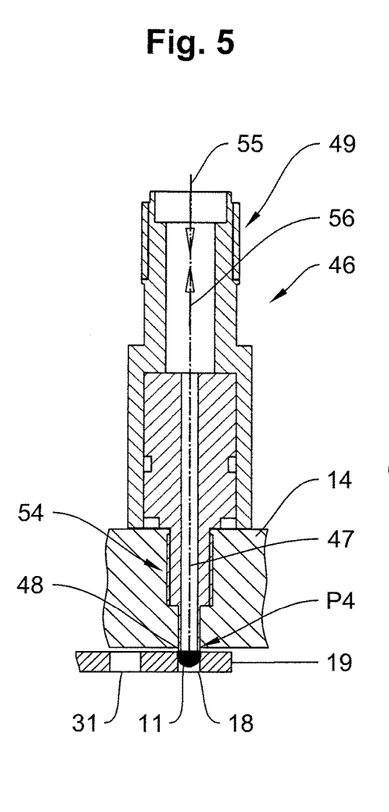
FIG. 5 shows a removal device of the device illustrated in FIG. 1 in a sectional illustration.
Figure 6:
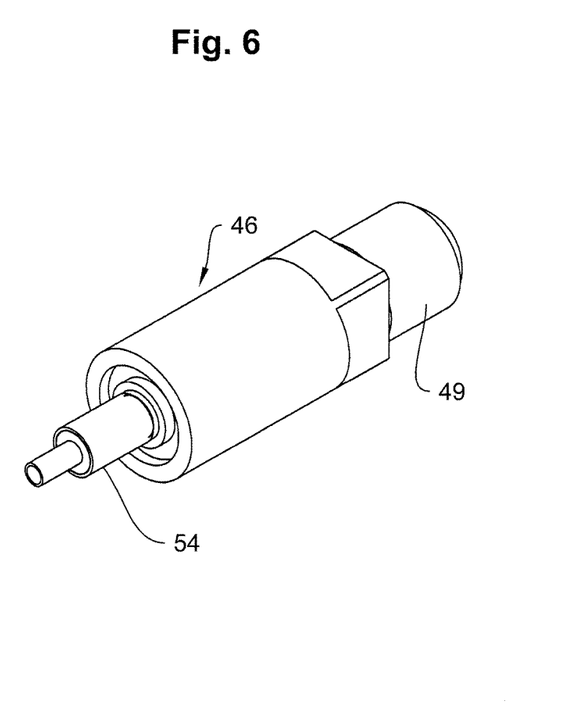
FIG. 6 shows the removal device illustrated in FIG. 5 in an isometric illustration.

For the application of pressure gas, the upper housing part 14 comprises a pressure gas connection 42 illustrated in FIGS. 1 and 4, which is connected via a pressure gas duct 43 to a solder material deposit receiving space 53 formed in the upper housing part 14 above the transfer position P2 opposite of the upper end of the supply duct 41 formed in the lower housing part 20. By means of the application of pressure gas to the solder material deposit 11 arranged in the solder material deposit receiving space 53, the solder material deposit 11 is transferred into the application position P3 at the application opening 37 of the application nozzle and also the laser treatment of the solder material deposit 11 arranged in the application position P3 is triggered indirectly via a pressure sensor 44. For this purpose, a pressure sensor 44 is connected via a pressure bore 45 to a pressure chamber 61 that is defined in the application duct 35 of the application device 33 between the application opening 37 and the cover 60 of the coupling device 38. The pressure sensor 44 detects an excess pressure forming in the pressure chamber 61, which occurs when the application opening 37 is closed by a solder material deposit 11 arranged in the application position P3. This means that, controlled by the pressure sensor 44, the laser treatment is triggered only if a solder material deposit 11 is located in the application position P3.

In the case at hand, the pressure sensor 44 is not only used to trigger the laser treatment of the solder material deposit 11 located in the application position P3, but also to trigger or activate a removal device 46 that, as can be taken in particular from a combined view of FIGS. 1, 4, 5 and 6, is arranged with a connecting piece 54 on the upper housing part 14 of the device 10 in such a manner that a removal duct 47 of the removing device 46 is located in a coaxial or flush arrangement with a transport holder 18 of the conveying device 19 that is arranged in a removal position P4. A duct end 48 of the removal duct 47 is arranged directly above the transport holder 18. At the upper end of the removal duct 47, the removal device 46 has a coupling device 49, which in the present case is used for the connection of a negative pressure device (not illustrated) and for the connection of an optical fiber (not illustrated) that introduces laser radiation into the removal duct 47.

The removal device 46 is triggered or activated by the pressure sensor 44 in the event that the pressure sensor 44 does not detect a pressure rise of defined height after an application of pressure gas to a solder material deposit 11 arranged in the transfer position P2, said pressure rise of defined height being typical for the case that the solder material deposit 11 previously arranged in the transfer position P2 has reached the application position P3 and blocks the application opening 37 of the application nozzle 36. If said pressure rise is not detected, this suggests that the solder material deposit 11 received in the transport holder 18 in the transfer position P2 has not at all or not completely left the transport holder 18, which means that the transport holder 18 is being blocked by the solder material deposit 11 or by parts of the solder material deposit 11 and that the solder material deposit 11 cannot be transferred into the application position P4.

Given this determination, the conveying device 19 is now clocked further by one graduation t so that another solder material deposit 11 can be applied. Owing to the continued clocking of the conveying device 19 in the conveying direction 32, the transport holder 18 being blocked by the solder material deposit 11 finally reaches the removal position P4 below the removal device 46 after a defined number of cycle steps so that, after the blockage of the transport holder 18 has been detected by the pressure sensor 44 and the defined number of cycles has been completed, the removal device 46 can be activated and the solder material deposit 11 blocking the transport holder 18 is treated with laser radiation 55 via the coupling device 49, consequently melting the solder material deposit 11. Simultaneously or immediately afterwards, the molten solder material deposit 11 is exposed to negative pressure 56 so that the solder material deposit 11 is removed from the transport holder 18 and the latter is available again to receive solder material deposits 11 from the solder material reservoir 12 after having been returned into the receiving position P1.

The invention claimed is:

1. A device for the separate application of solder material deposits, said device comprising:
a solder material reservoir, a conveying device, an application device and a removal device, the removal device being arranged downstream of the application device;
the conveying device adapted for separately conveying solder material deposits of a plurality of solder deposits from the solder material reservoir toward the application device, wherein the conveying device has a plurality of transport holders formed as passage holes, each of said transport holders being movable from a receiving position P1 into a transfer position P2, in said receiving position P1, each transport holder receives a solder material deposit of said plurality of solder deposits from the solder material reservoir, in said transfer position P2, each solder material deposit received in the transport holder is exposed to a pressure gas and the solder material deposit received in the transport holder is transferred to the application device from said transfer position P2 into an application position P3, wherein the application device is adapted to apply the solder material deposit from the application position P3 against a contact surface of a substrate with said pressure gas; and
wherein the removal device is adapted to remove the solder material deposit received in the transport holder from the transport holder arranged in a removal position P4 downstream of the transfer position and, the removal device is connected to a detector device triggering removal of the solder material deposit of the plurality of solder material deposits received in the transport holder, said detector device checking a presence of a solder material deposit in the transfer position.

2. The device according to claim 1, in which the detector device has a pressure sensor that measures gas pressure of the pressure gas between the transport holder arranged in the transfer position P2 and an application opening in an application nozzle.

3. The device according to claim 2, in which the removal device has a removal duct for coaxial arrangement of a duct end of the removal duct with the transport holder arranged in the removal position P4, a negative pressure connection exposing the removal duct to a negative pressure, and a coupling device for connection to an energy source that is used for the treatment of a solder material deposit arranged in the transport holder.

4. The device according to claim 3, including a housing, wherein the removal duct is a connecting piece of the removal device, said connecting piece allowing a removable mechanical connection of the removal device to the housing in such a manner that the removal duct is arranged coaxially to the transport holder arranged in the removal position P4.

5. The device according to claim 2, in which the coupling device allows the removal device to be coupled to a laser source emitting laser radiation.

6. The device according to claim 5, in which the coupling device allows contact-free coupling to the laser source.

7. The device according to claim 5, in which the coupling device is a connection device for an optical fiber transmitting laser radiation of the laser source.

* * * * *